US006600636B1

(12) United States Patent
Liikanen et al.

(10) Patent No.: US 6,600,636 B1
(45) Date of Patent: Jul. 29, 2003

(54) MAGNETIC HEAD WITH WRITE ELEMENT OFFSET FROM READ ELEMENT

(75) Inventors: Bruce Liikanen, Berthoud, CO (US); Terry Schemmel, Longmont, CO (US); Jenny Himle, Boulder, CO (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 09/416,135

(22) Filed: Oct. 12, 1999

(51) Int. Cl.[7] ............................................. G11B 5/127
(52) U.S. Cl. ...................................................... 360/317
(58) Field of Search ................................ 360/317, 332, 360/123, 121, 126

(56) References Cited

U.S. PATENT DOCUMENTS

| 3,246,307 A | | 4/1966 | Stanley ..................... 340/174.1 |
|---|---|---|---|
| 3,887,944 A | | 6/1975 | Bajorek et al. |
| 3,908,194 A | | 9/1975 | Romankiw |
| 3,975,772 A | | 8/1976 | Lin |
| 4,649,447 A | | 3/1987 | Huang et al. |
| 4,729,048 A | | 3/1988 | Imakoshi et al. |
| 4,849,841 A | * | 7/1989 | Sokolik ........................ 360/126 |
| 5,020,213 A | | 6/1991 | Aronoff et al. ................ 29/603 |
| 5,073,833 A | | 12/1991 | Best et al. ................ 360/77.05 |
| 5,208,715 A | | 5/1993 | Mowry |
| 5,212,611 A | | 5/1993 | Dee |
| 5,229,901 A | | 7/1993 | Mallary |
| 5,235,484 A | | 8/1993 | Maruyama |
| 5,568,335 A | | 10/1996 | Fontana et al. |
| 5,587,850 A | | 12/1996 | Ton-that ................... 360/77.08 |
| 5,596,463 A | | 1/1997 | Hashimoto |
| 5,612,843 A | * | 3/1997 | Packard ....................... 360/123 |
| 5,710,943 A | | 1/1998 | Burton et al. ................ 395/872 |
| 5,751,526 A | | 5/1998 | Schemmel |
| 5,771,141 A | * | 6/1998 | Ohtsuka et al. ............. 360/332 |
| 5,786,957 A | | 7/1998 | Inoue et al. ............. 360/77.08 |
| 5,864,450 A | | 1/1999 | Chen et al. |
| 5,898,548 A | | 4/1999 | Dill et al. |
| 6,055,138 A | * | 4/2000 | Shi ............................. 360/126 |
| 6,101,068 A | * | 8/2000 | Ohtomo et al. ............. 360/126 |
| 6,339,523 B1 | * | 1/2002 | Santini ........................ 360/317 |

OTHER PUBLICATIONS

U.S. patent application Ser. No. 09/073,600, Schreck et al., filed Mar. 10, 1998.
U.S. patent application Ser. No. 09/037,938, Schreck et al., filed Mar. 10, 1998.
Yoshida, M.; Terunuma, K.; Iijima, A.; Sasaki, Y., "Writing Performance of IND/SV Combination Heads with Sub–Micron Track Width", *1999 IEEE International Magnetics Conference Digest of Technical Papers* (1999).

* cited by examiner

*Primary Examiner*—Allen Cao
(74) *Attorney, Agent, or Firm*—Sheridan Ross P.C.

(57) ABSTRACT

A computer disk drive transducer head having spatially separated read and write heads is provided. The transducer head reduces or eliminates servo errors during write operations by positioning the read head of the transducer away from the write head. This spatial separation prevents the disruption of magnetic domains in the read head, and in particular in the magnetoresistive element and the shields in the immediate vicinity of the magnetoresistive element. The present invention further provides a method for reducing servo errors during write operations by spatially separating the read and write heads by a distance sufficient to limit the strength of a magnetic field produced in the read head during a write operation to no greater than the strength of a magnetic field produced in the read head by the magnetic disk.

44 Claims, 5 Drawing Sheets

MAGNETIC HEAD WITH WRITE ELEMENT OFFSET FROM READ ELEMENT

FIELD OF THE INVENTION

The present invention relates to computer disk drive transducer heads. In particular, the present invention relates to transducer heads having an inductive write head and a magnetoresistive or a giant magnetoresistive read head.

BACKGROUND OF THE INVENTION

Computer disk drives store information on magnetic disks. Typically, the information is stored on each disk in concentric tracks, divided into sectors. Information is written to and read from a disk by a transducer head, mounted on an actuator arm capable of moving the transducer head radially over the disk. Accordingly, the movement of the actuator arm allows the transducer head to access different tracks. The disk is rotated by a spindle motor at a high speed, allowing the transducer head to access different sectors on the disk.

A typical computer disk drive is illustrated in FIG. 1. The disk drive, generally identified by reference numeral 20 includes a base 24 and magnetic disks 28 (only one of which is shown in FIG. 1). The magnetic disks 28 are interconnected to the base 24 by a spindle motor (not shown) mounted within or beneath the hub 32, such that the disks 28 can be rotated relative to the base 24 Actuator arm assemblies 36 (only one of which is shown in FIG. 1) are interconnected to the base 24 by bearings 40, such that they can be moved radially with respect to the magnetic disks 28. The actuator arm assemblies 36 include transducer heads 44 (only one of which is illustrated in FIG. 1) at a first end, to address each of the surfaces of the magnetic disks 28. A voice coil motor 48 pivots the actuator arm assemblies 36 about the bearings 40, to radially position the transducer heads 44 across the surfaces of the magnetic disks 28. The voice coil motor 48 is operated by a controller 52 that is in turn operatively connected to a host computer (not shown). By changing the radial position of the transducer heads 44 with respect to the magnetic disks 28, the transducer heads 44 can access different data tracks or cylinders 56 on the magnetic disks 28.

A typical transducer head contains functionally separate write and read heads, or elements, that are integrated into a unitary, thin film structure. A conventional thin film transducer head 100 is illustrated in FIGS. 2 and 3, and generally includes a write head 104 and a read head 108.

The write head 104 is usually what is known as an inductive head. Where such heads are constructed from ferrite material, they are known as ferrite heads. The write head 104 generally includes a yoke of magnetically conductive material formed from a write pole 112 and a shared shield 116. A coil of electrically conductive wire 118 is wrapped about a portion of the yoke, and the ends of that coil are connected to a current source (not shown). During a write operation, current is introduced to the coil in a first direction. The electrical current through the coil produces a magnetic field within the yoke. At a gap 120 formed between an end of the write pole 112 and an end of the shared shield 116, the magnetic field spreads out because the magnetic permeability of the gap is less than that of the yoke itself. The gap 120 is positioned so that it is in close proximity to the magnetic disk, allowing some of the magnetic field to pass through the disk and magnetize a portion of the disk in a particular direction. In a typical disk drive for use in a digital computer, a "one" is coded by reversing the direction in which the disk is magnetized from one portion of a track to the next. This is done by reversing the direction of the current in the coil. A zero is indicated by the absence of a change in magnetic polarity. Of course, these conventions could be reversed.

The read head 108 in a disk drive operates by sensing the magnetic flux transistions encoded in the disk by the write operation. One method of sensing such transistions is with a magnetoresistive head. Such a head is comprised of material that changes its electrical resistance when it is exposed to a magnetic field. Magnetoresistive heads have come into wide use in disk drive systems because they are capable of providing high signal output. High signal output is important, because the magnetic fields produced in the disks by the write operation are very small. In addition, the high signal output of the magnetoresistive head allows the data on the disk to be densely packed, allowing the disk drive to have a high storage capacity.

Magnetoresistive read heads generally include a strip of magnetoresistive material 124 held between two magnetic shields. In the conventional transducer head illustrated in FIGS. 2 and 3, the magnetic shields are formed from the shared shield 116 and a read shield 128. Each end of the strip of magnetoresistive material 124 is connected to a conductor (not shown). The conductors are in turn connected to a current source (not shown). Because the electrical resistance of the magnetoresistive material varies with the strength and direction of an applied magnetic field, magnetic flux transistions result in changes in the voltage drop across the magnetoresistive strip. These changes in the voltage drop are sensed and then converted into a digital signal for use by the host computer.

In order to sense the transistions between the small magnetic fields and thus retrieve data from the magnetic disk, the magnetoresistive read head 108 is held in close proximity to the track containing the desired information. The disk 28 is rotated under the head 44, and flux transitions read by the head 44 are interpreted as a binary "one", as described above. The magnetic shields on either side of the magnetoresistive material 124 limit the effect of magnetic flux transitions adjacent to or in the proximity of the precise area of the track from which information is to be retrieved. Often, one pole of the inductive write head also serves as part of the shield. This shared shield is typically about 1–3 µm thick.

In FIG. 3, a typical transducer head 100 having a write head 104 and a read head 108 is illustrated in plan view. As described above, the write head 104 generally includes a write pole 112 and a shared shield or pole 116 with a write gap 120 therebetween. The read head 108 generally includes the shared shield 116, a magnetoresistive element 124, and a read shield 128. Such heads are typically manufactured using thin film layering techniques.

The strength of the magnetic field produced in the read head 108 from the data written to the storage disk 28 is small (from 10–50 oersteds). However, while writing the magnetic field that must be produced by the write head to encode the data by magnetizing the disk is relatively large (as much as several thousand oersteds). The strong magnetic field produced by the inductive write head during a write operation affects the operation of the magnetoresistive read head. The strength of the magnetic field produced in the read head 108 during a write operation can be as strong as several hundred oersteds. This strong magnetic field is believed to, at times, force an unstable magnetic domain state in the shield and/or permanent magnet structures of the read head, since conventional read heads are only designed to sense magnetic fields of about 50 oersteds. Accordingly, following a write operation, the magnetoresistive head may undergo write induced instabilities when the magnetic domain state of the shields and/or permanent magnet structures revert to their normal state. When the reversion occurs, the read head cannot reliably read information from the storage disk.

Because it is necessary to maintain the position of the transducer head over the disk with high accuracy, the transducer head must be able to read servo sector information embedded periodically about the disk both during, and following, write operations. Where the read transducer is unable to confirm the correct position of the transducer head relative to the storage disk, the write operation must be terminated. After such a servo error, the write operation must be suspended until the disk has traveled through one complete revolution and the sector where the write operation was interrupted is reached again, so that writing may be "retried". The performance of the drive, which is required to write information with high speed and high accuracy, can be significantly diminished by such errors. Write-induced magnetic instabilities in the read head also affect the manufacturing efficiency of disk drives, as drives that exhibit a predetermined number of write-instability related servo errors during post-manufacturing testing cannot be shipped to consumers.

Typically, the read and write heads of a transducer are aligned so that they are positioned over the same track (see FIG. 3). The distance between the read and write heads of a transducer head are typically kept as small as possible in a downtrack direction in order to limit the skew of the heads relative to the data tracks. However, because the read and write elements of a transducer head are separate from one another in a downtrack direction, they are generally unable to follow the same path over the disk. The amount by which the paths of the read and write heads differ, or the skew, depends on the radial position of the transducer head over the disk. This presents a problem during write operations, during which the read head is used to position the transducer in the center of the data track onto which information is to be written, because the write head will not be centered in the track. In order to correct this problem, disk drives often move the transducer head immediately after reading the servo data to correctly position the write head. This adjustment is known as "microjogging." In general, "icrojog" operations have generally been limited to distances of less than one track width, or less than about 2 µm.

Another solution for limiting the skew of the read and write elements relative to the data tracks, and thus to limit the amount of microjog, is to stagger the read and write elements laterally with respect to the data track. The optimum amount of lateral offset between the read and write elements depends on the geometry of the particular disk drive assembly, but is generally less than one track width, or less than about 2 µm. For example, U.S. patent application Ser. No. 08/798,606, now U.S. Pat. No. 5,978,168, issued Nov. 2, 1999, and which is assigned to the assignee of the present application, discloses a lateral or cross-track offset between the read and write elements relative to the data tracks to reduce skew and to therefore reduce the amount of microjog necessary to center the write element over the data track.

While these existing disk drive designs do offset the read and write elements from one another, they fail to solve the problem of write induced instabilities in the read element since the spacing between the write and read elements is small, usually less than 2 or 3 microns.

It would be advantageous to provide a transducer head having a read element that is capable of accurately reading servo information in close temporal proximity to a write operation. In addition, it would be advantageous to provide a system that does not produce spurious or unreliable signals from the read element following a write operation. Furthermore, it would be advantageous to produce a transducer head that is reliable and inexpensive to manufacture.

SUMMARY OF THE INVENTION

In accordance with the present invention, a computer disk drive transducer head is provided having spatially separated read and write heads. The read head may be offset from the write head either in a cross-track direction, in a downtrack direction, or both in a cross-track and in a downtrack direction. The transducer head design of the present invention operates by spacing the read head away from the write head, and thereby reducing the amount of magnetic flux produced during write operations that passes through or in close proximity to the read head. In particular, the read and write heads are separated sufficiently that the strength of the magnetic field seen by the read head during write operations is about equal to the strength of the magnetic field of the magnetic storage disks seen by the read head.

According to a first embodiment of the present invention, the transducer head of the present invention generally includes a magnetoresistive read head spaced apart from an inductive write head by a shared shield or pole, and laterally offset from the center line of the write head so that the center of the read head and the center of the write head are separated by an amount sufficient that the strength of the magnetic field in the read head during a write operation is about zero. The transducer head, according to this embodiment, utilizes the shared pole both as a shield for the magnetoresistive read head and as a pole of the inductive write head.

In a second embodiment, the transducer head of the present invention includes an inductive write head and a magnetoresistive read head that are not integral with each other. The separate read and write heads may be positioned such that they are laterally offset from each other. According to this embodiment, because the read and write heads are not integral with one another, they may be placed in any spatial relationship to one another. In a preferred embodiment, the read head is positioned so that it is spaced apart from the write head a distance sufficient that the strength of the magnetic field in the read head during a write operation is about zero.

According to a third embodiment of the present invention, a shared shield between the write gap and the magnetoresistive head is thick enough to space the read head and the write head sufficiently far apart that the strength of the magnetic field in the read head during a write operation is about zero. This embodiment of the invention allows for the magnetoresistive head to be spaced widely from the write gap of the inductive write head.

Based on the foregoing summary, a number of salient features of the present invention are readily discerned. A computer disk drive transducer head is provided with improved performance. In particular, a transducer head is provided in which disruption to the read head's ability to reliably retrieve information from the storage disk following or during a write operation is reduced or eliminated.

Additional advantages of the present invention will become readily apparent from the following discussion, particularly when taken together with the accompanying drawings.

BRIEF DESCRIPTION OF THE DRAWINGS

FIG. 5b is a plan view of an alternative configuration of the transducer head of FIG. 5a.

DETAILED DESCRIPTION

In accordance with the present invention, a computer disk drive transducer head having a read head that is a spatially separated from the write head to reduce or eliminate write induced instabilities is provided.

As is well-known in the art, the strength of a magnetic field decreases rapidly as the distance from the center of the field is increased. The inventors have recognized that, by positioning the read head of a transducer head sufficiently distant from the read head, disruptions to the magnetic domains in and near the read head can be reduced or eliminated, thereby reducing or eliminating servo errors in the drive due to write induced instabilities.

Figure 4:
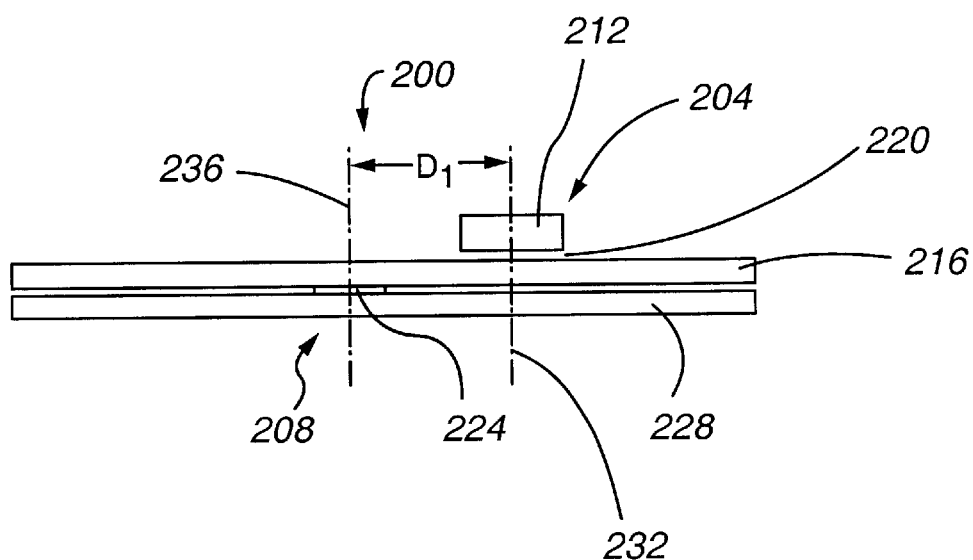
FIG. 4 is a plan view of a transducer head in accordance with an embodiment of the present invention having laterally offset read and write heads and a shared shield therebetween, wherein the illustrated surface of the transducer head faces the magnetic disk.

With reference to FIG. 4, transducer head 200 is shown from the perspective of a storage disk (not shown). The transducer head 200 generally includes a write head or element 204 and a read head or element 208. The write head 204 includes a write pole 212 and a shared pole 216 that together form the write gap 220. The read head 208 generally includes the shared pole or shield 216, a magnetoresistive element 224 and a read shield 228.

In operation, the transducer head 200 is placed in close proximity to the rotating storage disk (not shown). As the disk rotates beneath the transducer head 200, the read head 208 reads servo information embedded in the storage disk. This servo information indicates the sector and track on the storage disk that the read head 208 is over and indicates whether the read element is centered on the track. In the embodiment illustrated in FIG. 4, the center line 232 of the write head 204 can be seen to be offset from the center line 236 of the read head 208 by an offset $D_1$. Therefore, when a sector of a track to which data is to be written is reached, the transducer head 200 is jogged to center the write head 204 over the track. As will be understood by those skilled in the art, track writing does not need to be performed at the center line of the track. Rather, it may be performed at a distance offset from one track centerline. Nevertheless, for ease in understanding the invention, the discussion herein will be directed to writing on the track centerline.

During the write operation, a relatively large magnetic field is generated in the magnetic circuit formed by the write pole 212 and the shared pole 216. In the shared pole 216, the magnetic field is strongest in the portion of the shared pole 216 that is proximate to the write pole 212, and weakens in portions of the shared pole 216 as the lateral distance from the write pole 212 is increased. Therefore, by positioning the magnetoresistive element 224 so that it is laterally offset from the centerline of the write pole 216, the strength of the magnetic field that both the magnetoresistive element 224 and the adjacent portion of the shared pole 216 are exposed to is reduced.

The amount of the lateral offset $D_1$, may vary, but is at least about 2 track widths, or about 1.7 $\mu$m at present areal densities. Typically, the lateral offset $D_1$ between the center line 232 of the write head 204 and the center line 236 of the read head 208 is at least about 5 $\mu$m for a shared shield 216 with a thickness of 2 to 3 $\mu$m. It has been found that, in a typical transducer head, the read head experiences a magnetic field in a range of from about 200 to about 500 oersteds during a write operation. It has been found that an offset $D_1$ of at least about 2 $\mu$m is effective at reducing the field seen by the read head 208 to about 100 oersteds or less during a write operation, thereby significantly reducing or eliminating servo errors due to write induced instabilities. In a preferred embodiment, with an offset $D_1$ of about 5 $\mu$m, the field seen by the read head 208 during a write operation is about 50 oersteds or less. In a most preferred embodiment, the offset $D_1$ is great enough that the strength of the magnetic field in the read head 208 during a write operation is no more than the strength of the magnetic field seen by the read head 208 from the magnetic media. Thus, in a most preferred embodiment, the strength of the magnetic field produced in the read head by a write operation is about zero. Presently, the strength of the magnetic field produced in the read head by the magnetic media alone is about 50 oersteds or less. As areal densities increase, this value is expected to decrease.

The write pole 212, the shared pole or shield 216, and the read shield 228 may be constructed from any known magnetically permeable material, such as permalloy. The write head 204 may be an inductive head, such as a ferrite head, and the read head 208 may be a magnetoresistive, giant magnetoresistive, or spin valve head. The transducer head 200 may generally be constructed using known techniques, such as thin film manufacturing techniques.

Figure 5A:
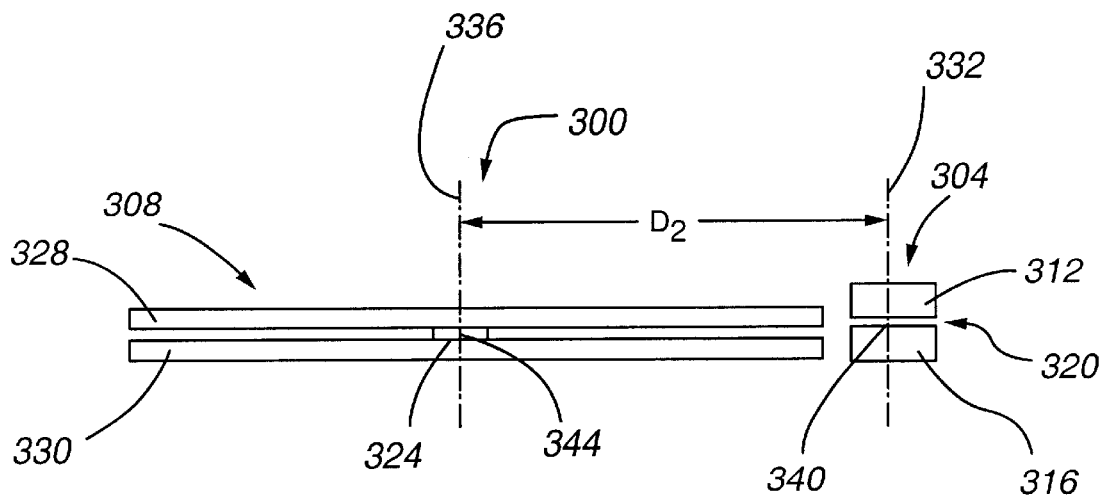
FIG. 5a is a plan view of a transducer head in accordance with another embodiment of the present invention having separate read and write heads and having write poles that are separated from read shields, wherein the illustrated surface of the transducer head faces the magnetic disk.

Referring now to FIG. 5a, a transducer head 300, according to a second embodiment of the present invention, is illustrated. In particular, FIG. 5a shows the surfaces of the transducer head 300 that are adjacent to a storage disk. The transducer head 300 generally includes a write head or element 304 and a read head or element 308. The write head 304 is generally comprised of a first write pole 312 and a second write pole 316 that are arranged such that they form a write gap 320 proximate the surface of the magnetic disk (not shown). The read head 308 is generally comprised of a magnetoresistive element 324 held between a first read shield 328 and a second read shield 330.

In the embodiment illustrated in FIG. 5a, it can be seen that the center line 332 of the write head 304 is laterally offset from the center line 336 of the read head 308. In addition, it can be seen that the write head 304 is distinct from the read head 308, there being no shared shield as in the embodiment illustrated in FIG. 4. As a result of this unique structure, there is a great deal of distance between the magnetoresistive element 324 and the write head 304. This distance reduces or eliminates instabilities in the magnetic domains of the first and second read shields 328 and 330 and in the magnetoresistive element 324 itself that are normally produced when write operations are carried out by the write head 304. Of course, the distance may vary, so long as the strength of the magnetic field seen by the read head 308 during a write operation is no greater than about 2 times the strength of the magnetic field seen by the read head 308 from the magnetic media alone. In a more preferred embodiment, the strength of the magnetic field in the read head 308 during a write operation is no greater than the strength of the magnetic field produced in the read head 308 by the magnetic media alone. Accordingly, the distance between the magnetoresistive element 324 and the write head 304 is preferably large enough that the strength of the magnetic field produced in the read head 308 by a write operation is about zero.

Figure 5B:
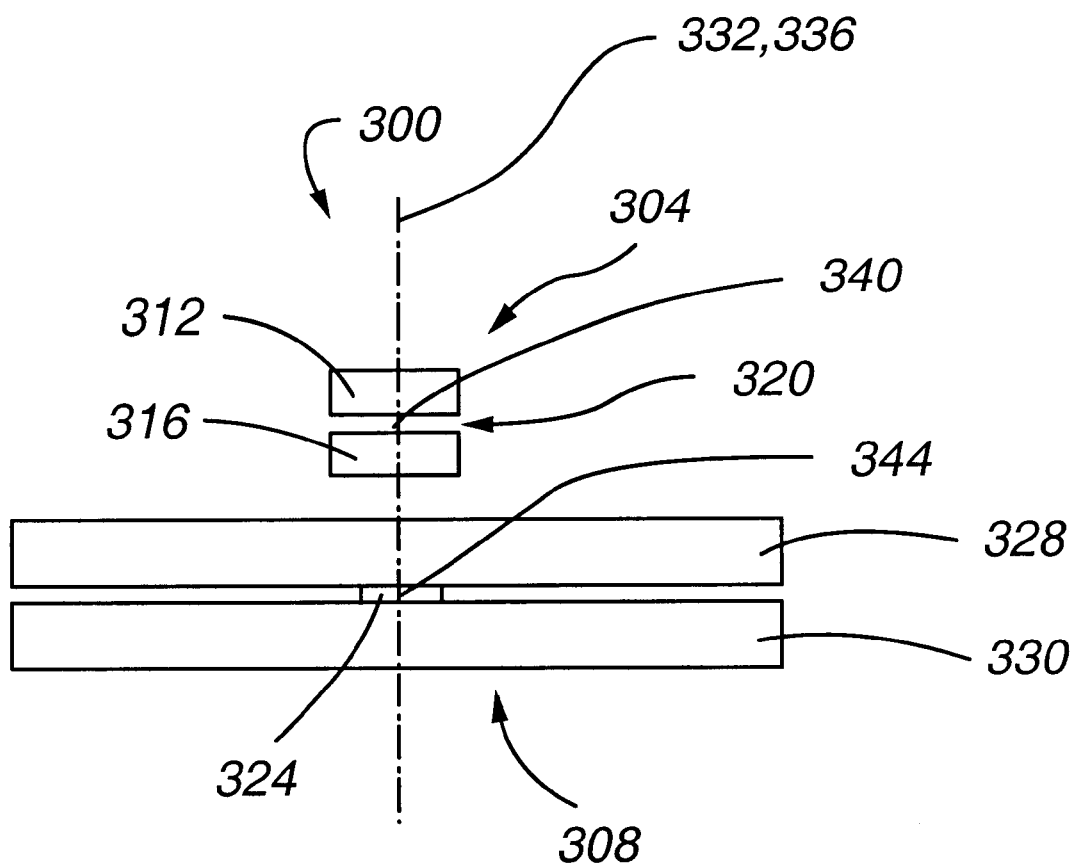

In the illustrated embodiment, the amount of the lateral offset $D_2$ between the center line 332 of the write head 304 and the center line 336 of the read head 308 is at least equal to half the width of the read shields 328 and 330, plus half the width of the write shields 312 and 316. In addition, although the embodiment illustrated in FIG. 5a shows the write 304 and read 308 heads having only a lateral offset, this need not be the case. Indeed, because the write head 304 and the read head 308 are separate from one another, and have no shields in common, they may be placed in any desired orientation. Accordingly, with respect to the magnetoresistive element 324, the write head 304 may be offset laterally as illustrated in FIG. 5a, or offset in a downtrack direction such that the center lines 332 and 336 of the write 304 and read 308 heads coincide with one another as illustrated in FIG. 5b, or spaced apart in both cross-track and downtrack directions. In addition, the embodiment illustrated in FIGS. 5a and 5b allows the write shields 312 and 316 to be constructed of material different from the read shields 328 and 330. This flexibility permits the designer to optimize the shields 312, 316, 328 and 330 for their specific purposes.

The spacing between the center 340 of the write head 304 and the center 344 of the magnetoresistive element 324 of the read head 308 may vary depending on the strength of the magnetic field produced by the write head 304 during write operations in a particular storage device. As illustrated in FIG. 5a, the separation between the center 340 of the write head 308 and the center 344 of the magnetoresistive element 324 will be greater than about 50 µm due to the extent of the read shield. Where the heads 304 and 308 are not so aligned (e.g., as illustrated in FIG. 5b) the distance from the center 340 of the write head 304 and the center 344 of the magnetic element 324 can be less. For example, in a disk drive having a write head 304 that produces a magnetic field of about 3000 oersteds in strength at the magnetic media, the distance between the center 340 of the write head 304 and the center 344 of the magnetoresistive element 324 should be at least about 4 µm so that the magnetic field in the read head 308 during the write operation is less than 50 oersteds, or about equal to the strength of the magnetic field produced in the read head 308 by the magnetic media. As with the other disclosed embodiments, the transducer head 300 may be constructed using known materials and techniques, such as thin film manufacturing techniques.

Figure 6:
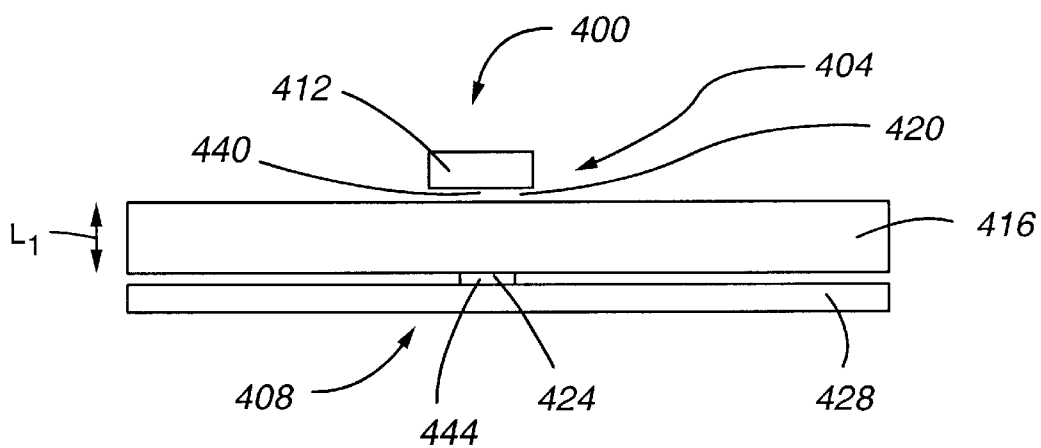
FIG. 6 is a plan view of a transducer head in accordance with yet another embodiment of the present invention having read and write heads separated by a thick shield, wherein the illustrated surface of the transducer head faces the magnetic disk.

Referring now to FIG. 6, a transducer head 400 according to a third embodiment of the present invention is illustrated. The transducer head 400 is generally comprised of a write head or element 404 and a read head or element 408. The write head 404 generally includes a write pole 412 and a shared shield 416. The write pole 412 and the shared shield 416 form a gap 420 adjacent to the surface of the storage disk or media (not shown). The read head 408 generally includes the shared shield 416, a magnetoresistive element 424 and a read shield 428.

Figure 1:
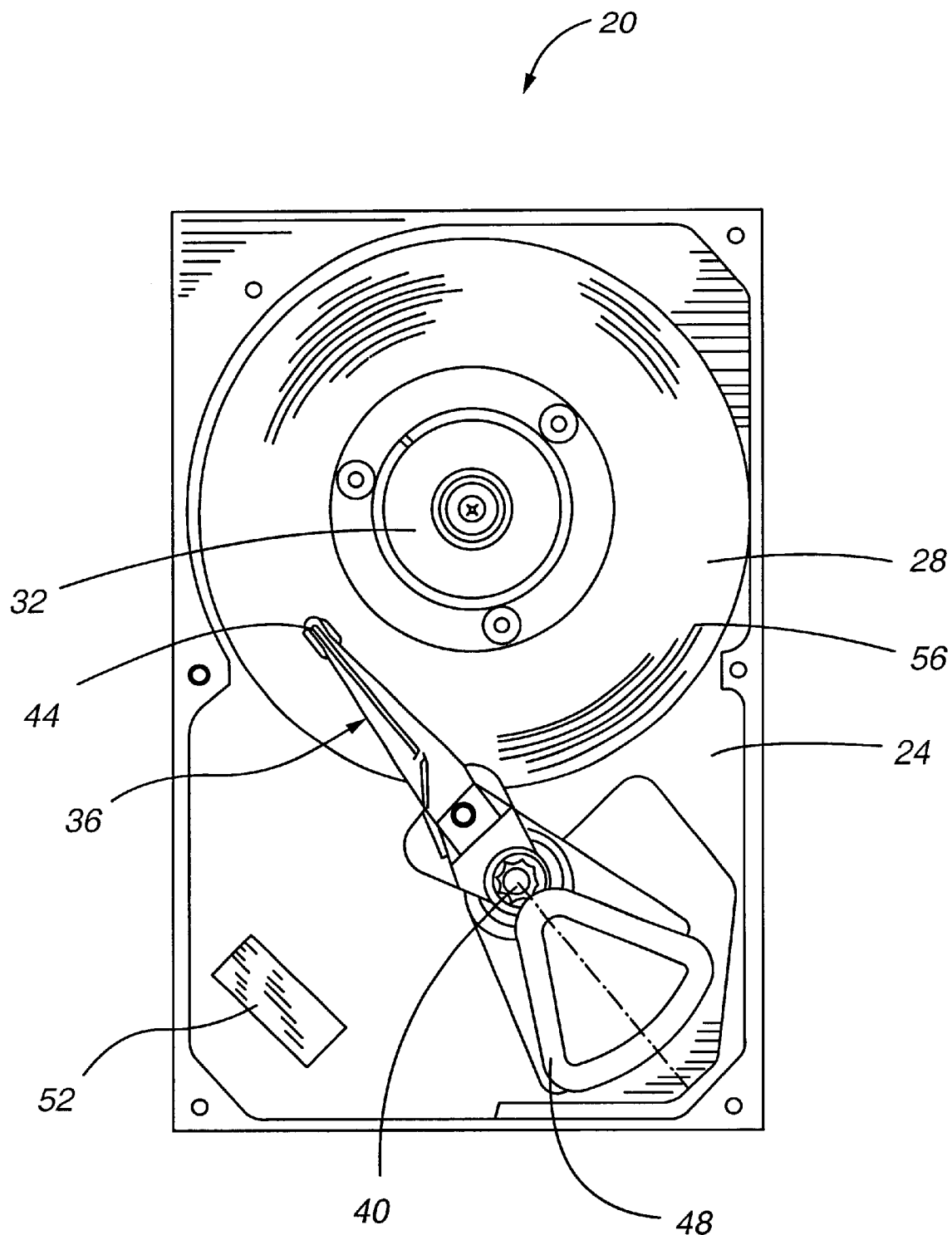
FIG. 1 is a top view of a conventional computer disk drive, with the cover removed.
Figure 2:
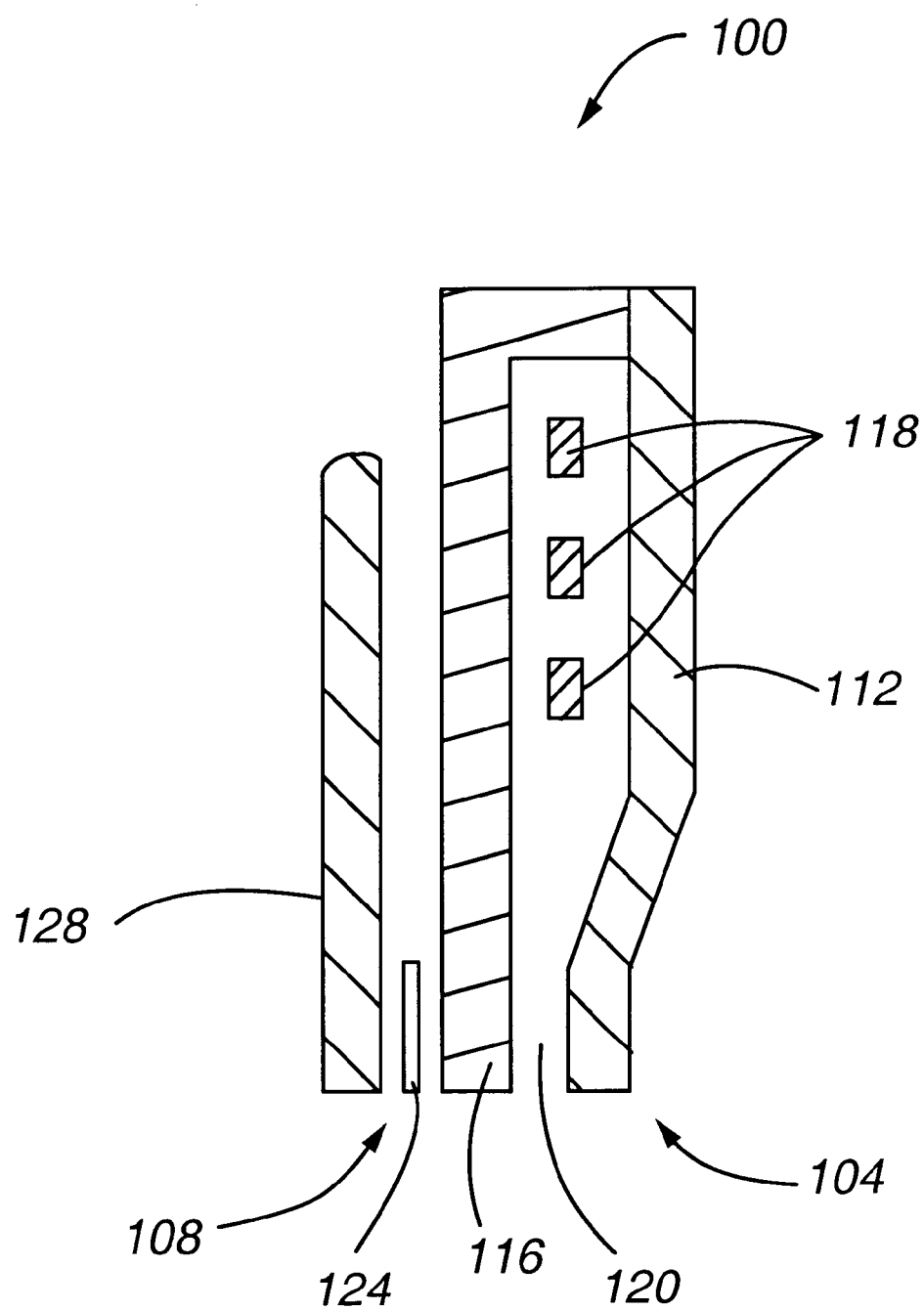
FIG. 2 is a cross sectional view of a conventional thin film transducer head.
Figure 3:
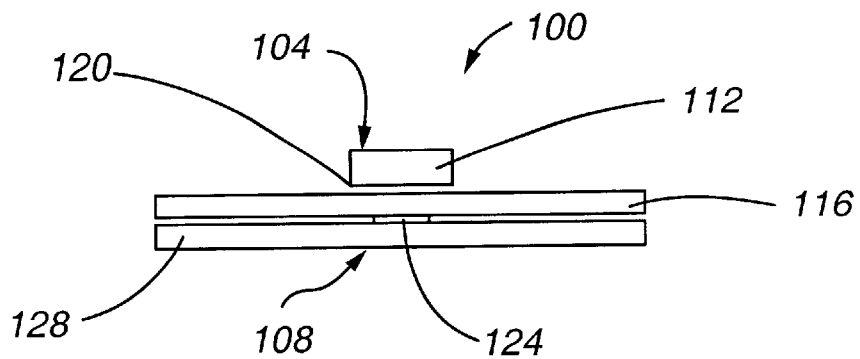
FIG. 3 is a plan view of a conventional transducer head incorporating an inductive write head and a magnetoresistive read head, wherein the illustrated surface of the transducer head faces the magnetic disk.

The transducer head 400 features a shared shield 416 that is substantially thicker than the conventional shared shield 116 illustrated in FIG. 3. The thick shared shield 416 serves to increase the downtrack distance $L_1$ between the gap 420 and the magnetoresistive element 424. Alternatively, the write gap 420 and the magnetoresistive element 424 may also be offset laterally, increasing the distance between the write gap 420 and the magnetoresistive element 424 even more. As with the other illustrated embodiments of the present invention, the relatively great distance between the write head 404 and the read head 408 reduces or eliminates unstable magnetic domains in, or in the immediate vicinity of, the magnetoresistive element 424. Accordingly, servo errors during, or immediately after, write operations are reduced or eliminated.

The thickness of the shield may be as large as desired. In a preferred embodiment, the shield 416 is thick enough that the strength of the magnetic field produced in the read head 408 during a write operation is no larger than the strength of the magnetic field produced in the read head 408 by the magnetic media alone. In one embodiment, the shield is at least 4 µm thick so that the total strength of the magnetic field produced in the read head 408 during a write operation is about 50 oersteds, or about equal to the strength of the magnetic field produced in the read head 408 by the magnetic media alone. Lateral offset between the center 440 of the write head 404 and the center 444 of the magnetoresistive element 424 may be small, such as about one-half track width, or 0.5 microns, in order to reduce the amount of microjog necessary during write operations. Alternatively, a greater amount of lateral offset may be used to further isolate the magnetoresistive element 424 from the magnetic field produced by the write head 404 during write operations. As a further alternative, the transducer head may be constructed with no lateral offset.

While the invention has been described in connection with magnetoresistive heads, the principles of this invention are equally applicable to giant magnetoresistive heads, spin valve heads, dual spin valve heads, or any other magnetic read sensor.

According to the present invention, a method is disclosed for allowing a transducer head to read from and write to a magnetic media while avoiding write induced servo errors. In particular, the present invention discloses a method to carry out read and write operations in close temporal proximity to one another. According to the method, the center of the gap of the write head is spacially separated from the center of a magnetoresistive material used to sense magnetic flux transistions in the storage media by the read head. The amount of the spatial separation between the read and write heads is preferably sufficient that the strength of the magnetic field produced in the read head during write operations is no greater than the strength of the magnetic field produced in the read head by the magnetic disk or other magnetic media.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A computer disk drive device, comprising:
   a magnetic storage disk;
   a transducer head comprising:
   a write head operable to write to said disk; and
   a read head operable to read from said disk, wherein said write head and said read head are separated by a distance sufficient such that a magnitude of a magnetic field produced in said read head by said write head during a write operation is no greater than a magnitude of a magnetic field produced in said read head by said magnetic media, wherein said distance separating said write head and said read head comprises a lateral offset between said write head and said read head.

2. The computer disk drive of claim 1, wherein a magnitude of a total magnetic field produced in said read head during a write operation is about equal to a magnitude of said magnetic field produced in said read head by said magnetic storage disk.

3. The computer disk drive of claim 1, wherein said distance is greater than about 5 $\mu$m.

4. The computer disk drive of claim 1, wherein said distance is greater than about 6 $\mu$m and less than about 25 $\mu$m.

5. The computer disk drive of claim 1, wherein said magnitude of said magnetic field produced in said read head by said write head during a write operation is no greater than about 50 oersteds.

6. A computer disk drive device, comprising:
   a magnetic storage disk;
   a transducer head comprising:
   a write head operable to write to said disk; and
   a read head operable to read from said disk, wherein said write head and said read head are separated by a distance sufficient such that a magnitude of a magnetic field produced in said read head by said write head during a write operation is no greater than a magnitude of a magnetic field produced in said read head by said magnetic media, wherein said distance separating said write head and said read head comprises an offset in a downtrack direction between said write head and said read head.

7. The computer disk drive of claim 6, wherein said write head comprises:
   a write pole having a first portion and a second portion, wherein said first portion is adjacent to a surface of said magnetic storage disk;
   a shared pole, having a first portion and a second portion, wherein said first portion of said shared pole is adjacent to said surface of said magnetic storage disk, wherein said second portion of said shared pole is magnetically interconnected to said second portion of said write pole to form a magnetic circuit, and wherein said first portion of said shared pole and said first portion of said write pole are spaced apart to form a gap therebetween and adjacent to a first side of said shared pole;
   a coil wrapped about a portion of said magnetic circuit of said write pole and said shared pole, wherein said coil is electrically interconnected to a write circuit to induce a magnetic field in said magnetic circuit during a write operation; and
   wherein said read head comprises:
   a magnetoresistive element adjacent to a second side of said shared pole.

8. The computer disk drive device of claim 7, wherein said write pole has a width, and wherein a lateral offset between a centerline of said write pole and a centerline of said magnetoresistive element is greater than about 150% of said width of said write pole.

9. The computer disk drive of claim 6, wherein a magnitude of a total magnetic field produced in said read head during a write operation is about equal to a magnitude of said magnetic field produced in said read head by said magnetic storage disk.

10. The computer disk drive of claim 6, wherein said distance is greater than about 5 $\mu$m.

11. The computer disk drive of claim 6, wherein said distance is greater than about 6 $\mu$m and less than about 25 $\mu$m.

12. The computer disk drive of claim 6, wherein said magnitude of said magnetic field produced in said read head by said write head during a write operation is no greater than about 50 oersteds.

13. A computer disk drive device, comprising:
    a magnetic storage disk;
    a transducer head comprising:
    a write head operable to write to said disk; and
    a read head operable to read from said disk, wherein said write head and said read head are separated by a distance sufficient such that a magnitude of a magnetic field produced in said read head by said write head during a write operation is no greater than a magnitude of a magnetic field produced in said read head by said magnetic media, wherein said distance separating said write head and said read head comprises a lateral offset and an offset in a downtrack direction between said write head and said read head.

14. The computer disk drive of claim 13, wherein a magnitude of a total magnetic field produced in said read head during a write operation is about equal to a magnitude of said magnetic field produced in said read head by said magnetic storage disk.

15. The computer disk drive of claim 13, wherein said distance is greater than about 5 $\mu$m.

16. The computer disk drive of claim 13, wherein said distance is greater than about 6 $\mu$m and less than about 25 $\mu$m.

17. The computer disk drive of claim 13, wherein said write head comprises:
    a write pole having a first portion and a second portion, wherein said first portion is adjacent to a surface of said magnetic storage disk;
    a shared pole, having a first portion and a second portion, wherein said first portion of said shared pole is adjacent to said surface of said magnetic storage disk, wherein said second portion of said shared pole is magnetically interconnected to said second portion of said write pole to form a magnetic circuit, and wherein said first portion of said shared pole and said first portion of said write pole are spaced apart to form a gap therebetween and adjacent to a first side of said shared pole;
    a coil wrapped about a portion of said magnetic circuit of said write pole and said shared pole, wherein said coil is electrically interconnected to a write circuit to induce a magnetic field in said magnetic circuit during a write operation; and wherein said read head comprises:
a magnetoresistive element adjacent to a second side of said shared pole.

18. The computer disk drive device of claim 17, wherein said write pole has a width, and wherein a lateral offset between a centerline of said write pole and a centerline of said magnetoresistive element is greater than about 150% of said width of said write pole.

19. The computer disk drive of claim 13, wherein said magnitude of said magnetic field produced in said read head by said write head during a write operation is no greater than about 50 oersteds.

20. A computer disk drive device, comprising:
a magnetic disk for storing data;
a read head;
a write head, wherein said read head and said write head are separated by a distance, and wherein a magnitude of a magnetic field produced in said read head following a write operation is no greater than a magnitude of a magnetic field produced by said magnetic disk in said read head during a read operation, wherein said distance comprises a lateral offset between said read head and said write head.

21. The computer disk drive of claim 20, wherein a magnitude of a magnetic field produced by said write head in said read head following a write operation is about zero.

22. The computer disk drive of claim 20, wherein a magnitude of a magnetic field produced by said write head in said read head following a write operation is less than about 50 oersteds.

23. The computer disk drive of claim 20, wherein said lateral offset is greater than about 25 $\mu$m.

24. A computer disk drive device, comprising:
a magnetic disk for storing data;
a read head;
a write head, wherein said read head and said write head are separated by a distance, and wherein a magnitude of a magnetic field produced in said read head following a write operation is no greater than a magnitude of a magnetic field produced by said magnetic disk in said read head during a read operation, wherein said distance comprises a downtrack offset between said read head and said write head.

25. The computer disk drive of claim 24, wherein a magnitude of a magnetic field produced by said write head in said read head following a write operation is about zero.

26. The computer disk drive of claim 24, wherein a magnitude of a magnetic field produced by said write head in said read head following a write operation is less than about 50 oersteds.

27. A computer disk drive device, comprising:
a magnetic disk for storing data;
a read head;
a write head, wherein said read head and said write head are separated by a distance, and wherein a magnitude of a magnetic field produced in said read head following a write operation is no greater than a magnitude of a magnetic field produced by said magnetic disk in said read head during a read operation, wherein said distance comprises a lateral offset and a downtrack offset between said read head and said write head.

28. The computer disk drive of claim 27, wherein a magnitude of a magnetic field produced by said write head in said read head following a write operation is about zero.

29. The computer disk drive of claim 27, wherein a magnitude of a magnetic field produced by said write head in said read head following a write operation is less than about 50 oersteds.

30. A computer disk drive device, comprising:
a magnetic storage disk;
an inductive write head having first and second poles, wherein said first and second poles define a write gap; and
a magnetoresistive read head, wherein said write head and said read head are separated by a distance sufficient that an amplitude of a total magnetic field produced in said read head when said write head writes to said magnetic storage disk is no greater than about two times an amplitude of a magnetic field produced in said read head by said magnetic storage disk alone, wherein said read head is located on a side of said second pole opposite said gap, wherein said distance separating said write head from said read head is established by a thickness of said second pole.

31. The computer disk drive of claim 30, wherein said second pole comprises a shared shield.

32. The computer disk drive device of claim 30, wherein said strength of said magnetic field produced in said read head during said write operation is less than about 100 oersteds and the strength of said magnetic field produced in said read head by said magnetic media alone is about 50 oersteds.

33. The computer disk drive device of claim 30, wherein said strength of said magnetic field produced in said read head during said write operation is less than about 50 oersteds and the strength of said magnetic field produced in said read head by said magnetic media alone is about 50 oersteds.

34. The computer disk drive device of claim 30, wherein said second pole has a thickness of greater than about 5 $\mu$m.

35. A computer disk drive device, comprising:
a magnetic storage disk;
an inductive write head having first and second poles, wherein said first and second poles define a write gap; and
a magnetoresistive read head, wherein said write head and said read head are separated by a distance sufficient that an amplitude of a total magnetic field produced in said read head when said write head writes to said magnetic storage disk is no greater than about two times an amplitude of a magnetic field produced in said read head by said magnetic storage disk alone, wherein said read head is located adjacent said write gap, and wherein said distance separating said write head from said read head comprises a lateral offset.

36. The computer disk drive of claim 35, wherein said second pole comprises a shared shield.

37. The computer disk drive device of claim 35, wherein said strength of said magnetic field produced in said read head during said write operation is less than about 100 oersteds and the strength of said magnetic field produced in said read head by said magnetic media alone is about 50 oersteds.

38. The computer disk drive device of claim 35, wherein said strength of said magnetic field produced in said read head during said write operation is less than about 50 oersteds and the strength of said magnetic field produced in said read head by said magnetic media alone is about 50 oersteds.

39. The computer disk drive of claim 35, wherein said read head comprises a first read shield and a second read shield.

40. The computer disk drive device of claim 35, wherein data is stored on said magnetic storage disk in tracks, and wherein said lateral offset is greater than about two times a width of a one of said tracks.

41. A computer disk drive device, comprising:

a magnetic storage disk;

an inductive write head having first and second poles, wherein said first and second poles define a write gap; and a magnetoresistive read head, wherein said write head and said read head are separated by a distance sufficient that an amplitude of a total magnetic field produced in said read head when said write head writes to said magnetic storage disk is no greater than about two times an amplitude of a magnetic field produced in said read head by said magnetic storage disk alone, wherein said read head is located on a side of said second pole opposite said gap, wherein said distance separating said write head and said read head comprises a distance established by a thickness of said second pole and a lateral offset between said write head and said read head.

42. The computer disk drive of claim 41, wherein said second pole comprises a shared shield.

43. The computer disk drive device of claim 41, wherein said strength of said magnetic field produced in said read head during said write operation is less than about 100 oersteds and the strength of said magnetic field produced in said read head by said magnetic media alone is about 50 oersteds.

44. The computer disk drive device of claim 41, wherein said strength of said magnetic field produced in said read head during said write operation is less than about 50 oersteds and the strength of said magnetic field produced in said read head by said magnetic media alone is about 50 oersteds.

* * * * *